US009484981B2

(12) United States Patent
Hsueh et al.

(10) Patent No.: US 9,484,981 B2
(45) Date of Patent: Nov. 1, 2016

(54) CDMA-BASED CROSSTALK CANCELLATION FOR ON-CHIP GLOBAL HIGH-SPEED LINKS

(71) Applicant: The Regents of the University of California, Oakland, CA (US)

(72) Inventors: Tzu-Chien Hsueh, Hillsboro, OR (US); Sudhakar Pamarti, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 7 days.

(21) Appl. No.: 14/324,291

(22) Filed: Jul. 7, 2014

(65) Prior Publication Data

US 2014/0321257 A1    Oct. 30, 2014

Related U.S. Application Data

(63) Continuation of application No. 12/878,547, filed on Sep. 9, 2010, now Pat. No. 8,773,964.

(51) Int. Cl.
*H04B 1/7103* (2011.01)
*H04B 1/7097* (2011.01)

(52) U.S. Cl.
CPC .......... *H04B 1/7103* (2013.01); *H04B 1/7097* (2013.01)

(58) Field of Classification Search
CPC ............................ H04B 1/7103; H04B 1/7097
See application file for complete search history.

(56) References Cited

U.S. PATENT DOCUMENTS

| 5,522,042 | A | * | 5/1996 | Fee | .......................... | H04L 29/06 |
| | | | | | | 709/226 |
| 5,784,366 | A | | 7/1998 | Apelewicz | | |
| 7,032,143 | B1 | * | 4/2006 | Waller | .................. | G11C 7/1051 |
| | | | | | | 365/201 |
| 7,957,254 | B2 | * | 6/2011 | Spirkl | ...................... | G11C 7/02 |
| | | | | | | 370/201 |
| 2003/0031196 | A1 | * | 2/2003 | Nishimura | .............. | H04B 1/707 |
| | | | | | | 370/441 |
| 2003/0235145 | A1 | * | 12/2003 | Shanbhag | ............... | H04J 14/02 |
| | | | | | | 370/201 |
| 2004/0110519 | A1 | * | 6/2004 | Chang | ...................... | H04B 5/02 |
| | | | | | | 455/502 |

OTHER PUBLICATIONS

Dhaou, I.B. et al., "Current Mode, Low-Power, On-Chip Signaling in Deep-Submicron CMOS Technology," IEEE Transactions on Circuits and Systems—I:Fundamental Theory and Applications, Mar. 2003, pp. 397-406, vol. 50, No. 3, IEEE.
Ho, R. et al, "Efficient On-Chip Global Interconnects," 2003 Symposium on VLSI Circuits Digest of Technical Papers, Jun. 12-14, 2003, pp. 271-274, IEEE.
Ho, R. et al., "The future of wires," Proceedings of the IEEE, Apr. 2001, pp. 490-504, vol. 89, No. 4, IEEE.

(Continued)

*Primary Examiner* — Habte Mered
(74) *Attorney, Agent, or Firm* — Withrow & Terranova, P.L.L.C.

(57) ABSTRACT

Synchronous CDMA/spread spectrum methods, devices, and systems are used to suppress crosstalk in clock-forwarded on-chip interconnects. Transmitting a spread spectrum signal across on-chip interconnects for recovery at the terminus permit integrated chip designers to overcome the effects of capacitive cross-talk between adjacent data bus lines. The methods, devices, and systems provided herein improve cross-talk immunity between adjacent high speed signal lines by applying synchronous CDMA spread spectrum techniques to some or all of the high speed signal lines. Other methods, devices, and systems provided herein apply synchronous CDMA spread spectrum techniques to the concept of sending phantom signals to reduce the number of signal lines used to carry data.

18 Claims, 7 Drawing Sheets

(56) References Cited

OTHER PUBLICATIONS

Kleveland, B. et al, "High-Frequency Characterization of On-Chip Digital Interconnects," IEEE Journal of Solid-State Circuits, Jun. 2002, pp. 716-725, vol. 37, No. 6, IEEE.

Kuboki, T. et al, "A 10Gbps/channel On-Chip Signaling Circuit with an Impedance-Unmatched CML Driver in 90nnn CMOS Technology," 2007 Design Automation Conference, Jan. 23-26, 2007, pp. 120-121, IEEE.

Park, J.Y. et al., "A 9Gbit/s serial transceiver for on-chip global signaling over lossy transmission lines," 2008 Custom Integrated Circuits Conference, Sep. 21-24, 2008, pp. 347-350, IEEE.

Zhang, L. et al., "A 32Gb/s On-chip Bus with Driver Pre-emphasis Signaling," 2006 Custom Integrated Circuits Conference, Sep. 10-13, 2006, pp. 265-268, IEEE.

Xu, Z. et al., "A 2.7 Gb/s CDMA-Interconnect Transceiver Chip Set with Multi-Level Signal Data Recovery for Re-configurable VLSI Systems," 2003 Solid-State Circuits Conference—Digest of Technical Papers, 2003, paper 82-479, vol. 1, IEEE.

Assembly and Packaging White Paper; System Level Integration in the Package, International Technology Roadmap for Semiconductors, web page last updated Dec. 8, 2009.

Dally, W. J. et al., "Digital Systems Engineering", Cambridge, UK: Cambridge University Press, 1998, pp. 39-42.

Hsueh, T. et al., "A 3 X 3.8 Gb/s Four-Wire High Speed I/O Link Based on CDMA-Like Crosstalk Cancellation," IEEE Journal of Solid-State Circuits, Aug. 2010, pp. 1522-1531, vol. 45, No. 8, IEEE.

Thierauf, S.C., "High Speed Circuit Board Signal Integrity," Boston, MA: Artech House, 2004, pp. 197-199.

Zogopoulos, S. et al., "High-Speed Single-Ended Parallel Link Based on Three-Level Differential Encoding," IEEE Journal of Solid-State Circuits, Feb. 2009, pp. 549-557, vol. 44, No. 2, IEEE.

Choi, S. et al., "A Three-Data Differential Signaling Over Four Conductors With Pre-Emphasis and Equalization: A CMOS Current Mode Implementation," IEEE Journal of Solid-State Circuits, Mar. 2006, pp. 633-641, vol. 41, No. 3, IEEE.

Gabara, T., "Phantom mode signaling in VLSI systems," 2001 Conference on Advanced Research in VLSI, 2001, pp. 88-100, IEEE.

Ha, K. et al., "A 6Gb/s/pin Pseudo-Differential Signaling Using Common-Mode Noise Rejection Techniques Without Reference Signal for DRAM Interfaces," 2009 Solid-State Circuits Conference—Digest of Technical Papers, Feb. 8-12, 2009, pp. 138-139, 139a IEEE.

Haykin, S.S., "Communication Systems," 4th Ed., New York: John Wiley & Sons, 2001, pp. 488-490.

Ho, A. et al., "Common-mode backchannel signaling system for differential high-speed links," 2004 Symposium on VLSI Circuits—Digest of Technical Papers, Jun. 17-19, 2004, pp. 352-355, IEEE.

Balamurugan, G.B. et al., "A Scalable 5-15 Gbps, 14-75 mW Low-Power I/O Transceiver in 65 nm CMOS," IEEE Journal of Solid-State Circuits, Apr. 2008, pp. 1010-1019, vol. 43, No. 4, IEEE.

Casper, B. et al., "A 20Gb/s Forwarded Clock Transceiver in 90nm CMOS B.," 2006 Solid-State Circuits Conference—Digest of Technical Papers, Feb. 6-9, 2006, pp. 263-272, IEEE.

Chang, M.F. et al., "Advanced RF/Baseband Interconnect Schemes for Inter- and Intra-ULSI Communications," IEEE Transactions on Electron Devices, Jul. 2005, pp. 1271-1285, vol. 52, No. 7, IEEE.

Razavi, B., "Design of Analog CMOS Integrated Circuits," New York: McGraw-Hill, 2001, pp. 118-124.

Sidiropoulos, S. et al., "A 700-Mb/s/pin CMOS Signaling Interface Using Current Integrating Receivers," IEEE Journal of Solid-State Circuits, May 1997, pp. 681-690, vol. 32, No. 5, IEEE.

Amirkhany, A. et al., "A 24 Gb/s Software Programmable Analog Multi-Tone Transmitter," IEEE Journal of Solid-State Circuits, Apr. 2008, pp. 999-1009, vol. 43, No. 4, IEEE.

Balamurugan, G.B. et al, "Modeling and mitigation of jitter in multiGbps source-synchronous I/O links," Proceedings of the 21st International Conference on Computer Design, Oct. 13-15, 2003, pp. 254-260, IEEE.

Hanomolu, P.K. et al., "Analysis of PLL Clock Jitter in High-Speed Serial Links," IEEE Transactions on Circuits and Systems—II: Analog and Digital Signal Processing, Nov. 2003, pp. 879-886, vol. 50, No. 11, IEEE.

Lawday, G. et al., "A Signal Integrity Engineer's Companion," Englewood CLiffs, NJ: Pearson Education, 2008, pp. 368-370.

Proakis J.G. et al., "Fundamentals of Communication Systems," Englewood Cliffs, NJ: Pearson Education, 2005, pp. 512-514.

Chang, K. et al., "Clocking and Circuit Design for a Parallel I/O on a First-Generation Cell Processor," 2005 IEEE International Solid-State Circuits Conference—Digest of Technical Papers, Feb. 10, 2005, pp. 526-527, 615, vol. 1, IEEE.

Lee, E.M. et al, "Low-Power Area-Efficient High-Speed I/O Circuit Techniques," IEEE Journal of Solid-State Circuits, Nov. 2000, pp. 1591-1599, Nov. 2000, vol. 35, No. 11, IEEE.

Lee, T.H. et al., "A 2.5 V CMOS Delay-Locked Loop for an 18 Mbit, 500 Megabyte/s DRAM," IEEE Journal of Solid-State Circuits, Dec. 1994, pp. 1491-1496, vol. 29, No. 12, IEEE.

Meghelli, M. et al., "A 10Gb/s 5-Tap-DFE/4-Tap-FFE Transceiver in 90nm CMOS," 2006 Solid-State Circuits Conference—Digest of Technical Papers, Feb. 6-9, 2006, pp. 213-222, IEEE.

Rabaey, J.M. et al., "Digital Integrated Circuits: A Design Perspective," 2nd Ed., Englewood Cliffs, NJ: Pearson Education, 2003, pp. 156-158.

Razavi, B., "Design of Integrated Circuits for Optical Communications," New York: McGraw Hill, 2003, pp. 131-132.

Yeung, E.F., "Design of High-Performance and Low-Cost Parallel Links," PhD Dissertation, Stanford University, Jan. 2002.

Zhang, H. et al., "Low-Swing On-Chip Signaling Techniques: Effectiveness and Robustness," IEEE Transactions on Very Large Scale Integration (VLSI) Systems, vol. 8, No. 3, Jun. 2000, pp. 264-272.

Non-Final Office Action for U.S. Appl. No. 12/878,547, mailed Nov. 7, 2012, 28 pages.

Non-Final Office Action for U.S. Appl. No. 12/878,547, mailed May 22, 2013, 34 pages.

Final Office Action for U.S. Appl. No. 12/878,547, mailed Dec. 19, 2013, 34 pages.

\* cited by examiner

CDMA-BASED CROSSTALK CANCELLATION FOR ON-CHIP GLOBAL HIGH-SPEED LINKS

RELATED APPLICATIONS

This application is a continuation of U.S. patent application Ser. No. 12/878,547, filed Sep. 9, 2010, now U.S. Pat. No. 8,773,964, which is hereby incorporated by reference in its entirety.

FIELD OF THE DISCLOSURE

This application relates to improved techniques for high speed links on chip dies to minimize the effects of cross-talk and capacitive coupling. The application further relates to using synchronous CDMA-spread spectrum techniques with on-chip high-speed data buses.

BACKGROUND

As the on-chip signal switching speeds exceed multi-gigahertz (GHz) and chip densities cross several millions of transistors, parasitic capacitive coupling between adjacent metal wires and the resistive-capacitance (RC) delay due to metal resistance are becoming significant. Crosstalk induced by capacitive coupling between metal wires may degrade signal quality, achievable data bandwidths, power efficiency and interconnect reliability.

Although these problems can be alleviated by increasing wire-to-wire spacing and decreasing parallel-run length between adjacent links, both of these solutions increase the routing complexity and the area necessary to route metal wires. Signal shielding using grounded metal wires may provide isolation from crosstalk noise. However, signal shielding can increase the metal routing area by 50%. Regular twisting of interconnect suppresses crosstalk in differential links. Yet, twisting requires vias and additional metal layers. The use of vias can increase wire resistance while additional metal layers complicates routing.

In addition, the aggregate bandwidth demands of chip-to-chip data communications are growing faster than the number of available I/O pins on chips, pushing the data rates of individual links even higher. Each individual link transmitting in the Gb/s range is typically a differential link which requires two input/output (I/O) pins per chip. Single-ended signaling, which requires only one wire (and hence one pin per chip) per link has also been unsuccessful in the Gb/s range owing to the problems caused by switching noise on the supply rails.

Accordingly, there is a need to develop an improved technique for routing on-chip wires that does not increase routing complexity, chip area, or increase wire resistance, and decreases signal degradation while permitting closer routing of wires over longer distances. There is also a need to develop improved techniques for minimizing the number of I/O pins used to transmit data between integrated chips and other circuitry.

SUMMARY OF THE DETAILED DESCRIPTION

Embodiments in the detailed description reduce the effects of capacitive coupling between data lines of a data bus on a semiconductor die. As an illustrative example, a single-ended data bus system may be configured to communicate data across an on-chip interconnect utilizing synchronous CDMA based spread spectrum techniques. Utilizing a short spread code to spread the data, data signals propagated along each of the data lines may be encoded to suppress cross-talk interference between the data lines. Transmitting a spread spectrum signal across on-chip interconnects for recovery at the terminus permit integrated chip designers to overcome the effects of capacitive cross-talk between adjacent data bus lines.

Based upon the principles of spread spectrum communications and synchronous CDMA, a short spreading code, $S(t)$, may be used with multiplication operations in the transmitter and the receiver of a high speed data bus to accomplish the spreading and de-spreading operations. For example, for a data bus having a plurality of data lines, divided into odd-links and even-links, the effects of capacitive coupling may be reduced by only multiplying signals on the odd-links with a spreading code that is orthogonal to those on the even-links.

The embodiments provided herein provide improved cross-talk immunity between adjacent high speed signal lines by applying synchronous CDMA spread spectrum techniques to each of the high speed signal lines. In some examples, the systems, devices, and methods provide improved cross-talk immunity between even and odd data lines. Other embodiments provide improved cross-talk immunity between nearby and adjacent data lines.

As a first example, a data bus on an integrated circuit die may include a first data line, the first data line having a first end and a second end, and a second data line substantially adjacent to the first data line, the second data line having a first end and a second end. The data bus may further include a first line driver including a first line driver input configured to receive a first data signal and a first line driver output in communication with the first end of the first data line. The first line driver may be configured to drive the first data signal onto the first data line and a first integrator including an input in communication with the second end of the second data line.

The first integrator may be configured to receive the first data signal and integrate the first data signal to generate a first received output. The data bus may also include a second line driver including a second line driver input and a second line driver output. The second line driver output may be in communication with the first end of the second data line and a first multiplier including a first input configured to receive a second data signal, a second input configured to receive a spread spectrum code, and an output in communication with the second line driver input. The first multiplier may be configured to modulate the second data signal based on the spread spectrum code to generate a modulated signal. The data bus may also include a second multiplier including an output, a first input coupled to the second end of the second data line, and a second input configured to receive a spreading code. The second multiplier may be configured to de-modulate the modulated signal based on the spreading code to generate a de-modulated signal and a second integrator in communication with the output of the second multiplier, the second integrator configured to integrate the de-modulated signal to generate a second received output.

As another example, a data bus for transmitting data on an integrated circuit may include a first differential signal line including a first signal line and a second signal line, where each of the first signal line and second signal line includes a first end and a second end, and a first multiplier configured to receive a spreading code and a data bit. The first multiplier may be configured to generate a modulated data bit based upon the data bit and a spreading code. The data bus may also include a differential line driver configured to receive the modulated data bit. The differential line driver has a non-inverting output and an inverting output. The non-inverting output is coupled to the first end of the first signal line and the inverting output is coupled to the first end of the second signal line. The differential line driver generates a non-inverted modulated data bit and an inverted modulated data bit. The data bus may further include a second multiplier and a third multiplier. The second multiplier may include a first input in communication with the second end of the first signal line, a second input configured to receive the spreading code, and an output. The second multiplier is configured to generate a non-inverted data bit at the output based upon the spreading code and the non-inverted modulated data bit. A third multiplier includes a first input in communication with the second end of the second signal line, a second input configured to receive the spreading code, and an output. The third multiplier is configured to generate an inverted data bit at the output based upon the spreading code and the inverted modulated data bit. The data bus may also include a differential integrator including a non-inverting input configured to receive the non-inverted data bit and an inverting input configured to receive the inverted data bit.

Another example system for transmitting data includes a method including providing a data bus on a integrated chip die, wherein the data bus includes a plurality of adjacent data lines, wherein the plurality of adjacent data lines include a first data line adjacent to a second data line. The method further includes modulating a first data bit on the first data line with a first spread spectrum code to generate a first spread signal. The method further includes modulating a second bit on the second data line with a second spread spectrum code to generate a second spread signal. The method further includes de-modulating the first spread signal with the first spread spectrum code and de-modulating the second spread signal with the second spread spectrum code.

Still another example is a data bus on a semiconductor die that includes one or more data links on the semiconductor die, wherein each of the one or more data links is configured to receive a data bit. Each of the one or more data links has a unique spreading code. Each of the data links includes a first multiplier including a first input configured to receive a data bit signal and a second input configured to receive the unique spreading code, the first multiplier configured to generate a modulated data bit based upon the data bit signal and the unique spreading code of the respective data line. Each of the data links further includes a line driver including a line driver input configured to receive the modulated data bit and a line driver output coupled to a first end of a data line. Each of the data links further includes a second multiplier including a first input coupled to a second end of the data line, a second input configured to receive the unique spreading code, the second multiplier configured to generate a demodulated data bit based upon the modulated data bit and the unique spreading code of the respective data line. Each of the data links also includes an integrator in communication with the second multiplier and is configured to generate an integrated output based upon the demodulated data bit.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Embodiments in the detailed description reduce the effects of capacitive coupling between data lines of a data bus on a semiconductor die. As an illustrative example, a single-ended data bus system may be configured to communicate data across an on-chip interconnect utilizing synchronous CDMA based spread spectrum techniques. Utilizing a short spread code to spread the data, data signals propagated along each of the data lines may be encoded to suppress cross-talk interference between the data lines. Transmitting a spread spectrum signal across on-chip interconnects for recovery at the terminus permit integrated chip designers to overcome the effects of capacitive cross-talk between adjacent data bus lines.

Based upon the principles of spread spectrum communications and synchronous CDMA, a short spreading code, S(t), may be used with multiplication operations in the transmitter and the receiver of a high speed data bus to accomplish the spreading and de-spreading operations. For example, for a data bus having a plurality of data lines, consisting of odd-links and even-links, the effects of capacitive coupling may be reduced by only multiplying signals on the odd-links with a spreading code that is orthogonal to those on the even-links.

The embodiments provided herein provide improved cross-talk immunity between adjacent high speed signal lines by applying synchronous CDMA spread spectrum techniques to each of the high speed signal lines. In some examples, the system, devices, and systems provide improved cross-talk immunity between even and odd data lines. Other embodiments provide improved cross-talk immunity between nearby and adjacent data lines.

For example, for a data bus having a plurality of data lines, consisting of odd-links and even-links, the effects of capacitive coupling may be reduced by only multiplying signals on the odd-links with a spreading code that is orthogonal to those on the even-links. As an example of a short spreading code, selecting orthogonal codes [1,1] for even-links and [1, −1] for odd links minimizes the hardware necessary to implement synchronous CDMA based techniques on the even-link and odd-link data bus lines, where the odd-links and even-links alternate, as depicted in FIG. 1.

Figure 1:
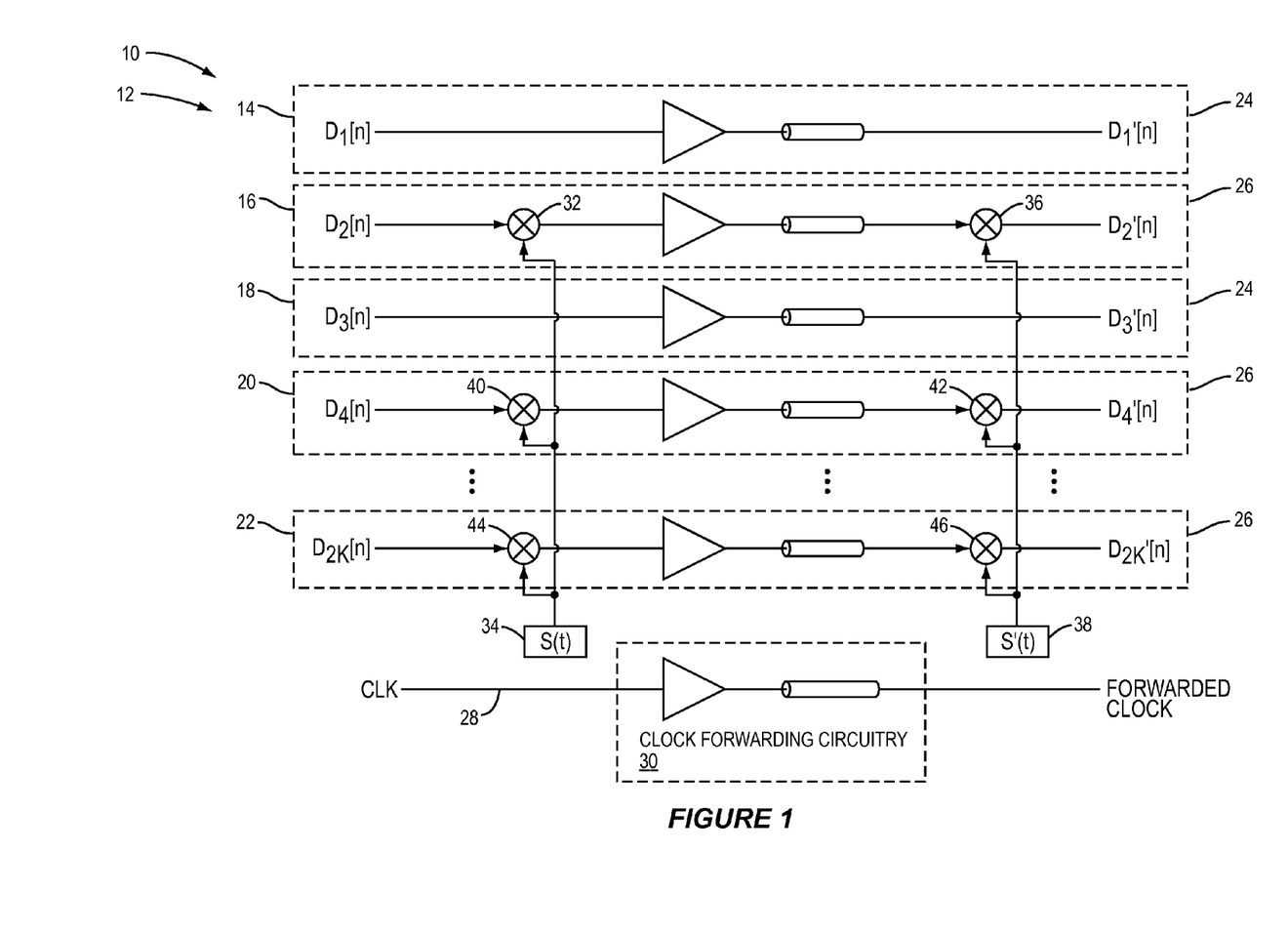
FIG. 1 depicts an example chip die having a data bus which includes a plurality of data links.

As depicted in FIG. 1, a single-ended data bus system 10 is configured to communicate data across an on-chip interconnect utilizing synchronous CDMA based spread spectrum techniques. Utilizing a short spread code to spread the data, data signals propagated along each of the data lines may be encoded to suppress cross-talk interference between the data lines.

FIG. 1 depicts the single-ended data bus system 10 on a chip die having a data bus 12 that includes a plurality of data links. The data bus 12 may include a first data link 14, a second data link 16, a third data link 18, a fourth data link 20, and a $2K^{th}$ data link 22. The data bus 12 may be further divided into odd data links 24 and even data links 26. In addition, the data bus 12 may further include a clock signal 28 coupled to clock forwarding circuitry 30. As will be further described below, data bus 12 may also include multipliers configured to spread spectrum modulate and demodulate some or all of the data transmitted across data bus 12.

FIG. 1 further depicts the second data link 16 including the first transmitter multiplier 32 configured to multiply data transmitted across the second data link 16 by a spreading code, S(t), 34. Second data link 16 further includes a first receiver multiplier 36 configured to de-spread the data transmitted through second data link 16 by a clock forwarded spreading signal S'(t) 38. The clock forwarded spreading signal, S'(t), 38 is a clock forwarded version of the spreading code S(t). The spreading code, S(t), 34 spreads data transmitted across the second data link 16 with short spreading code that is orthogonal to the data transmitted through either the first data link 14 or the third data link 18. The same spreading code, S(t), 34 is clock forwarded to account for propagation delay and used to generate a clock forwarded spreading signal S'(t) 38. The clock forwarding spreading code, S'(t), 38 is used to de-spread the received data.

Similarly, the fourth data link 20 includes a second transmitter multiplier 40 configured to spread the data transfer through the fourth data link 20, and a second receiver multiplier 42 configured to de-spread the transmitted data. Lastly, the $2K^{th}$ data link 22 further includes the third transmitter multiplier 44 and a third receiver multiplier 46 for spreading and de-spreading the data transmitted through the $2K^{th}$ data link 22. Because the data propagated along the even data links is orthogonal to the data propagated along the odd data links, the configuration of data bus 12 reduces the effects of cross-talk between the even data links 26 and odd data links 24.

FIG. 1 also depicts a clock signal, CLK, coupled to clock forwarding circuitry 30. The clock forwarding circuitry 30 provides time aligned clock signals to the data bus 12 to ensure proper data capture and time aligned presentation of the clock forwarded spreading signal, S'(t), 38.

Figure 2:
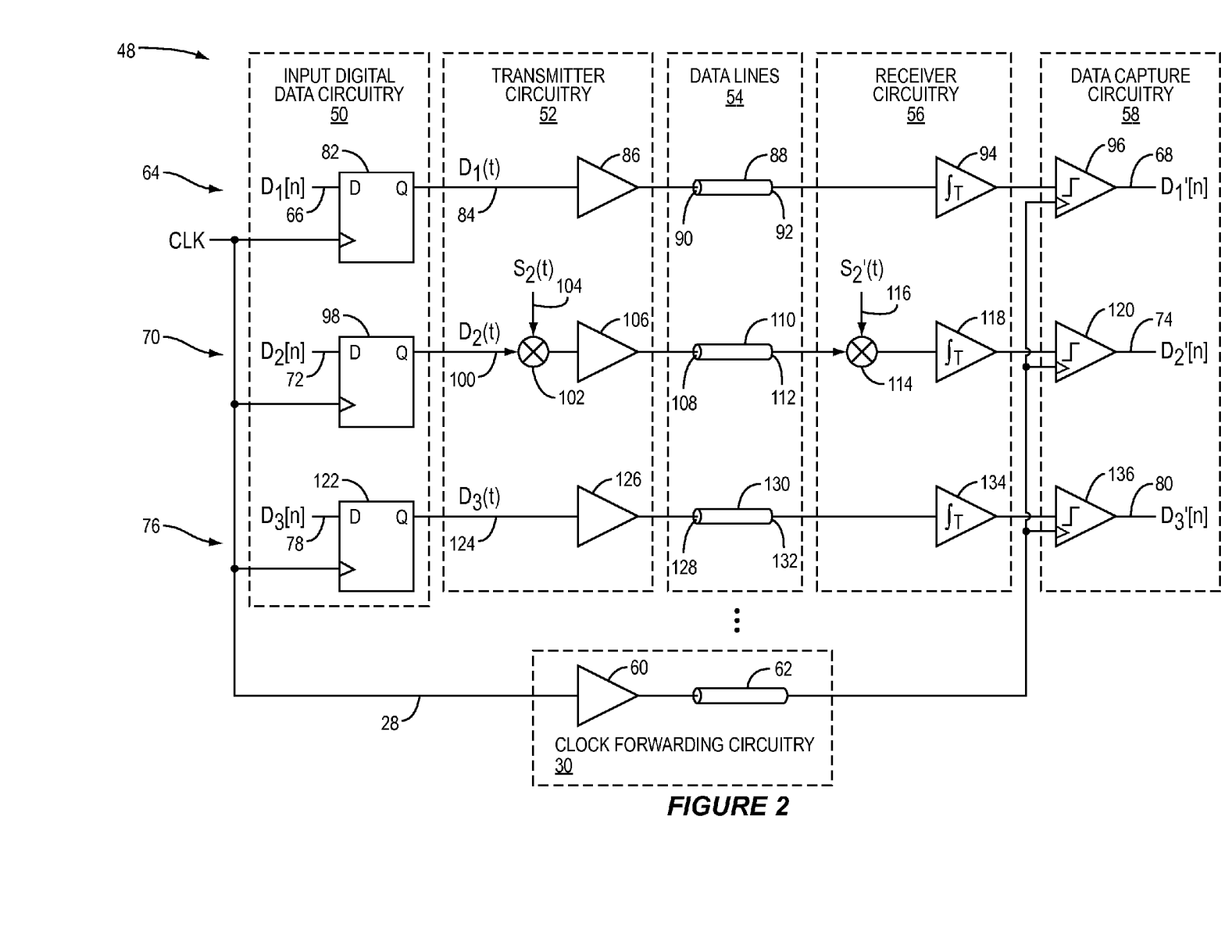
FIG. 2 depicts an example chip die having a spread spectrum based on-chip, low swing, single-ended interconnection with clock forwarding.

FIG. 2 depicts the single-ended data bus 48 that includes input digital data circuitry 50 coupled to transmit circuitry 52, which is coupled to data lines 54. Data transmitted across data lines 54 is received by receiver circuitry 56 and captured by data capture circuitry 58. In addition, the single ended data bus system 48 further includes a clock signal 28 in communication with clock forwarding circuitry 30.

Similar to the first data link 14 of FIG. 1, the single ended data bus system 48 includes a first data link 64 configured to communicate a first data bit, ($D_1[n]$), 66 to a first data output, ($D_1'[n]$), 68. Similar to the second data link 16 of FIG. 1, the single ended data bus system 48 further includes a second data link 70 for communicating the second data bit, ($D_2[n]$), 72 to the second data output, ($D_2'[n]$), 74. Lastly, similar to the third data link 18 of FIG. 1, the single ended data bus system 48 further includes a third data link 76 to communicate with a third data bit, ($D_3[n]$), 78 to a third data output, ($D_3'[n]$), 80.

The first data link 64 further includes a first data bit, ($D_1[n]$), 66 in communication with a first data output, ($D_1'[n]$), 68. The second data link 70 provides communication between a second data bit, ($D_2[n]$), 72 and a second data output, ($D_2'[n]$), 74. The third data link 76 provides communication between the third data bit, ($D_3[n]$), 78 and a third data output, ($D_3'[n]$), 80. The clock signal is communicated through a clock forwarding circuit 30, which includes the clock driver 60 and a clock line 62. The shared source-synchronous (or clockforwarded) circuitry 30 is used to minimize clocking power per link and reduce complexity and latency. Since a significant portion of the transmission jitter and phase drift are common between the clock and parallel data lines, the forwarded clock circuitry can be implemented by a replica of the data links. That is, the same circuit architecture as the data link 64 can be used for clock forwarding, but the input data stream should be replaced by a clock signal [ . . . 1 0 1 0 1 0 . . . ]. The forwarded clock may be a half rate clock which can be directly used for the two-way interleaved architecture (not shown in FIG. 2) in the receiver circuitry 56 and data capture circuitry 58. A local de-skew circuit, for example a delay-locked loop and phase interpolator, may be required to optimize the sampling phase for the receiver circuitry 56 and data capture circuitry 58. To enhance the tracking ability of the forwarded clock to data, careful layout technique can be used to match the clock and data drivers.

The first data link includes a first data buffer 82 configured to receive the first data bit ($D_1[n]$) 66 and output the first data signal ($D_1(t)$) 84. The first data signal 84 is received by a first driver 86. The first data line 88 receives the output of the first driver 86 at a first data line input 90. The received output of first driver 86 may be transmitted through first data line 88 to a first data line output 92, which is coupled to a first integrator 94. The first integrator 94 integrates the received output of the first driver 86, which is provided to the first decision gate 96. The first decision gate 96 may sample the received output and latch the sampled signal to determine an output level versus a threshold level. As an example, the first decision gate may be a sample and hold circuit.

Based upon threshold level, the first decision gate 96 provides an output of either logic HIGH or logic LOW as a first data output ($D_1'[n]$) 68. Because the first data link 64 does not include a multiplier, the effective short spread spectrum code used to transmit the first data signal 84 is [1,1].

In contrast, second data link 70 includes a second data buffer 98 configured to receive the second data bit ($D_2[n]$) 72. The output of data buffer 98 is second data signal ($D_2(t)$) 100. The first transmitter multiplier 102 receives the second data signal ($D_2(t)$) 100 along with a spreading code, $S_2(t)$, 104, where the spreading code is [1, −1]. The spreading code for spreading the second data signal 100 is orthogonal to the effective spreading code [1, 1] used to "spread" the first data signal of the first data link 64. The output of the first transmitter multiplier 102 generates a spread spectrum signal based upon the spreading codes of the spreading code, $S_2(t)$, 104. The second driver 106 drives the second data line input 108 of second data line 110. The second data line output 112 of second data line 110 couples to a first receiver multiplier 114. The second receiver multiplier 114 is also configured to receive a clock forwarded spreading code, $S_2'(t)$, 116, which has a spreading code of [1, −1] that is time shifted by the clock forwarding circuitry 30. The output of the first receiver multiplier is integrated by second integrator 118 to produce a detectable output at the input of first receiver second decision gate 120. The output of the second integrator 118 is compared to a threshold level to generate the second data output ($D_2'[n]$) 74. Because the second data bit on the second data link 70 is orthogonal to the data transmitted on the first data link 64, capacitive coupling between the first data line 88 and the second data line 110 is effectively cancelled out.

Likewise, third data link 76 includes a third data buffer 122 configured to receive a third data bit, $D_3[n]$, 78. A third data buffer 122 outputs a third data signal, $D_3(t)$, 124 to third driver 126. Third driver 126 drives the third data line input 128 of third data line 130, which is output at third data line output 132 of the third data line 130. The output of the third data line 130 is received by third receiver integrator 134, which integrates the received signal over a sample period of time. The output of the third receiver integrator 134 is received by a third decision gate 136, which provides the third data output, ($D_d'[n]$, 80. Similar to the first data link 64, the third data link 76 has an effective spreading code equal to [1,1], which is orthogonal to the spreading code [1, −1]. Accordingly, data transmitted through the third data line 130 is orthogonal to the data transmitted across the second data line 110.

Figure 3:
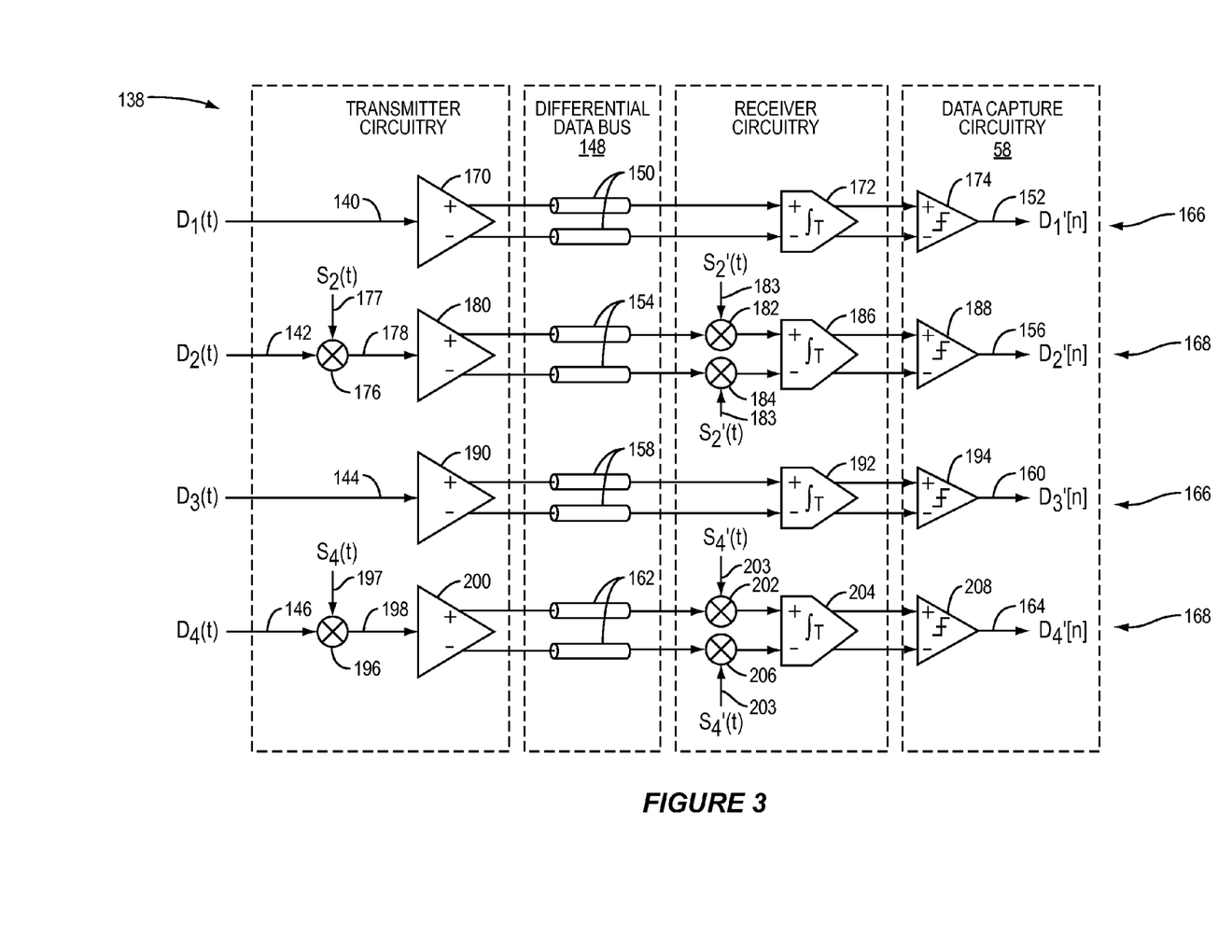
FIG. 3 depicts an example chip die having a spread spectrum based on-chip differential interconnect with clock forwarding (not explicitly shown).

FIG. 3 depicts a differential data bus system 138 for communication of data across a data bus on a semiconductor die. The differential data bus system 138 is configured to receive a first data signal ($D_1(t)$) 140, a second data signal ($D_2(t)$) 142, a third data signal ($D_3(t)$) 144, and a fourth data signal ($D_4(t)$) 146 for transmission. The differential data bus 148 may include a first differential data line 150 associated with the first data signal ($D_1(t)$) 140 and a first data output ($D_1'[n]$) 152, a second differential data line 154 associated with the second data signal ($D_2(t)$) 142 and a second data output ($D_2'[n]$) 156, a third differential data line 158 associated with the third data signal ($D_3(t)$) 144 and a third data output ($D_3'[n]$) 160, and a fourth differential data line 162 associated with the fourth data signal ($D_4(t)$) 146 and a fourth data output ($D_4'[n]$) 164.

Similar to the single ended data bus system 48 of FIG. 1, the differential data bus system 138 of FIG. 3 is based upon applying a short spread spectrum code to the data of the data links. The Hadamard codes applied to the data of the first data signal 140 and the third data signal 144 are orthogonal to the Hadamard code applied to the data of the second data signal 142 and the fourth data signal 146. As an example, the Hadamard code applied to the odd data links may be [1, 1] while the Hadamard code applied to the even data links may be [1, −1]. As a result, the spread spectrum signals of the odd data links 166 are orthogonal to the spread spectrum signals of the even data links 168.

FIG. 3 further depicts that the first data signal ($D_1(t)$) 140 is coupled to a first differential driver 170, which drives the first differential data line 150. The first differential data line 150 is coupled to the inverting input and non-inverting input of a first integrator 172. The differential outputs of the received differential signals are integrated by the first integrator 172 over a data sample period. The differential outputs of the first integrator 172 are coupled to the differential inputs of a first decision device 174. The first decision device 174 subtracts the differential inputs to generate a received signal and thereafter samples the received signal to determine a first data output ($D_1[n]$) 166, which corresponds to the first data signal 140 ($D_1(t)$).

The second data signal ($D_2(t)$) 142 is coupled to a first multiplier 176, which also receives a spreading code, $S_2(t)$, 177. The first multiplier 176 multiplies the second data signal 142 by a spreading code, $S_2(t)$, 177 to modulate the second data signal 142. The output of the first multiplier 176 generates a first spread spectrum signal 178 that is orthogonal to the first data signal 140 and the third data signal 144. A second differential driver 180 receives the first spread spectrum signal 178 and drives the second differential data line 154. A second multiplier 182 receives the non-inverting output of the second differential data line 154. The second multiplier 182 multiplies the non-inverting output of the second differential data line 154 by the clock forwarded spreading code $S_2'(t)$ 183 to demodulate the received signal and generate a non-inverted de-spread signal, which is integrated by differential integrator 186. The clock forwarded spreading code, $S_2'(t)$, 183 is a clock forwarded version of the spreading code $S_2(t)$ 177. A third multiplier 184 receives the inverted output of the second differential data line 154 and the clock forwarded spreading code, $S_2'(t)$, 183. The third multiplier 184 multiplies the output of the inverting output of the second differential data line 154 by the clock forwarded spreading code, $S_2'(t)$, 183 to generate an inverted de-spread signal, which is integrated by differential integrator 186. A differential decision device 188 receives the differential outputs of differential integrator 186 and generates a second data output ($D_2'[n]$) 168, which corresponds to the second data signal ($D_2(t)$) 142.

The third data signal ($D_3(t)$) 144 is coupled to a third differential driver 190, which drives a third differential data line 158. The third differential data line 158 is coupled to the inverting and non-inverting input of a differential integrator 192. The differential outputs of the differential integrator 192 are coupled to the differential inputs of a third decision device 194, which generates a third data output ($D_3'[n]$) 160, which corresponds to the third data signal 144 ($D_3(t)$).

The fourth data signal ($D_4(t)$) 146 is processed similarly to the second data signal 142. The fourth data signal ($D_4(t)$) 146 is coupled to a fourth multiplier 196, which also receives a spreading code, $S_4(t)$, 197. The fourth multiplier 196 multiplies the fourth data signal ($D_4(t)$) 146 by the spreading code, $S_4(t)$ 197, to generate a second spread spectrum signal 198, which is orthogonal to the first data signal ($D_1(t)$) 140 and the third data signal ($D_3(t)$) 144. A fourth differential driver 200 receives the second spread spectrum signal 198 and drives a fourth differential data line 162. A fifth multiplier 202 receives the non-inverting output of the fourth differential data line 162 and a clock forwarded spreading code, $S_4'(t)$, 203. The fifth multiplier 202 multiplies the non-inverted output of the fourth differential data line 162 and the spreading code, $S_4'(t)$, to generate a non-inverted de-spread signal, which is integrated by differential integrator 204. The clock forwarded spreading code $S_4'(t)$, is a time forwarded version of the spreading code $S_4(t)$. A sixth multiplier 206 receives the inverted output of the fourth differential data line 162 and the clock forwarded spreading code $S_4'(t)$ 203. The sixth multiplier 206 multiplies the output of the inverting output of the fourth differential data line 162 and the clock forwarded spreading code, $S_4'(t)$, to generate an inverted de-spread signal, which is integrated by the differential integrator 204. A differential decision device 208 receives the differential outputs of differential integrator 204 and generates a fourth data output, $D_4'[n]$, 168, which corresponds to the fourth data signal, $D_4[t]$, 146.

Figure 4:
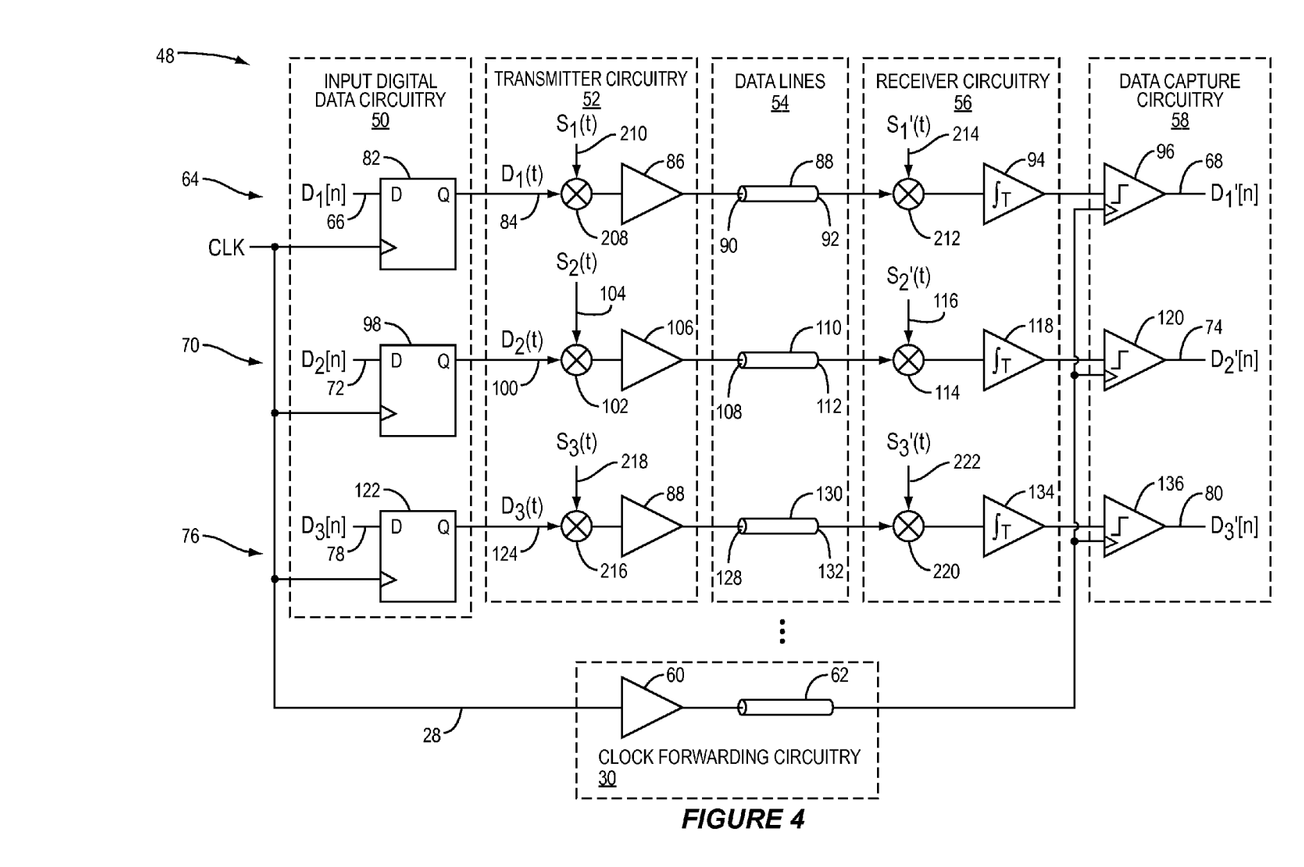
FIG. 4 depicts another example of a spread spectrum based on-chip, low swing, single-ended interconnection with clock forwarding.

Similar to FIG. 2, FIG. 4 depicts a modified example of the single ended data bus system 48 that provides improved cross-talk immunity between both even and odd data lines. In other words, the first data signal $D_1[n]$ is spread by a first spreading signal, $S_1(t)$, the second data signal $D_2[n]$ is spread by a second spreading signal, $S_2(t)$, and the third data signal $D_3[n]$ is spread by a third spreading signal, $S_3(t)$. The spreading codes $S_1(t)$, $S_2(t)$, and $S_3(t)$ may be selected to be mutually orthogonal to one another. As an example, the spreading code for $S_1(t)$ may be [1, 1, −1, −1]. The spreading code for $S_2(t)$ may be [1, −1, 1, −1]. The spreading code for $S_3(t)$ may be [1, −1, −1, 1]. As a result, the orthogonal spread spectrum signals passed through data lines 54 are mutually orthogonal to one another. In similar fashion, the first clock forwarded spreading signal, $S_1'(t)$, 214, may have an orthogonal spreading code [1, 1, −1, −1]. The second clock forwarded spreading signal, $S_2'(t)$, 116 may have an orthogonal spreading code of [1, −1, 1, −1]. The third clock forwarded spreading signal, $S_3(t)$, 222, may have an orthogonal spreading code of [1, −1, −1, 1].

As a result, data transmitted through each of the data links depicted in FIG. 4 are mutually orthogonal, which improves immunity to capacitive coupling between each data line to another data line.

Figure 5:
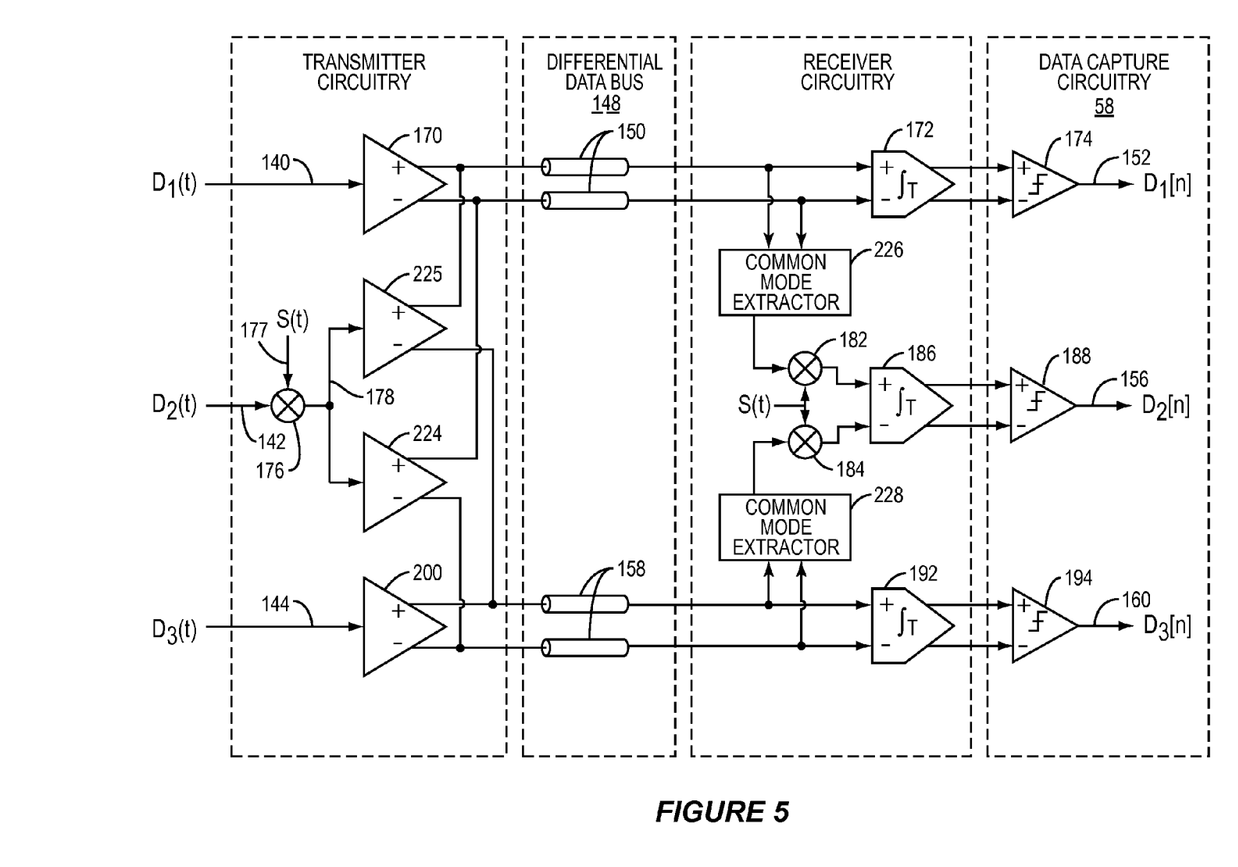
FIG. 5 depicts an example of a spread spectrum based differential interconnect to communicate a phantom signal.

FIG. 5 depicts a spread spectrum CDMA technique to transmit a phantom signal over two differential data lines. Similar to FIG. 3, FIG. 5 includes a differential data bus 148 and related circuitry to transmit a first data bit 140 ($D_1(t)$), a second data bit ($D_2(t)$) 142, and a third data bit ($D_3(t)$) 144. The first data bit 140 and third data bit 144 are transmitted as described above with respect to FIG. 3. However, the second data bit 142 is transmitted over the first differential data line 150 and third differential data line 158 as a common mode signal.

The second data signal ($D_2(t)$) 142 is coupled to a first multiplier 176, which also receives a spreading code, S(t), 177. The first multiplier 176 multiplies the second data signal 142 by a spreading code, S(t), 177 to modulate the second data signal 142. The output of the first multiplier 176 generates a first spread spectrum signal 178 that is orthogonal to the first data signal 140 and the third data signal 144. The first data signal 140 and the third data signal 144 are effectively multiplied by a spreading code [1, 1] while the second data signal 142 is multiplied by a spreading code [1, −1]. A first differential driver 224 and a second differential driver 225 receive the first spread spectrum signal 178.

The first differential driver 224 generates a first non-inverted output and a first inverted output. The second differential driver 225 generates a second non-inverted output and a second inverted output. The first non-inverted output and the second non-inverted output are coupled to the first differential data line 150 and transmitted as a common mode signal to a first common mode extraction circuitry 226. The first inverted output and second inverted output are coupled to the third differential data line 158 and transmitted as a common mode signal to a second common mode extraction circuitry 228. The output of the first common mode extraction circuit is a non-inverted output of the first differential driver 224 and the second differential driver 225. The output of the second common mode extraction circuitry 228 is the associated inverted output of the first differential driver 224 and the second differential driver 225. Thereafter, the second multiplier 182 receives the non-inverting output.

The second multiplier 182 multiplies the non-inverted output by the clock forwarded spreading code S(t) to demodulate the received signal and generate a non-inverted de-spread signal, which is integrated by differential integrator 186. A differential decision device 188 receives the differential outputs of the differential integrator 186 and generates a second data output ($D_2[n]$) 156.

Figure 6:
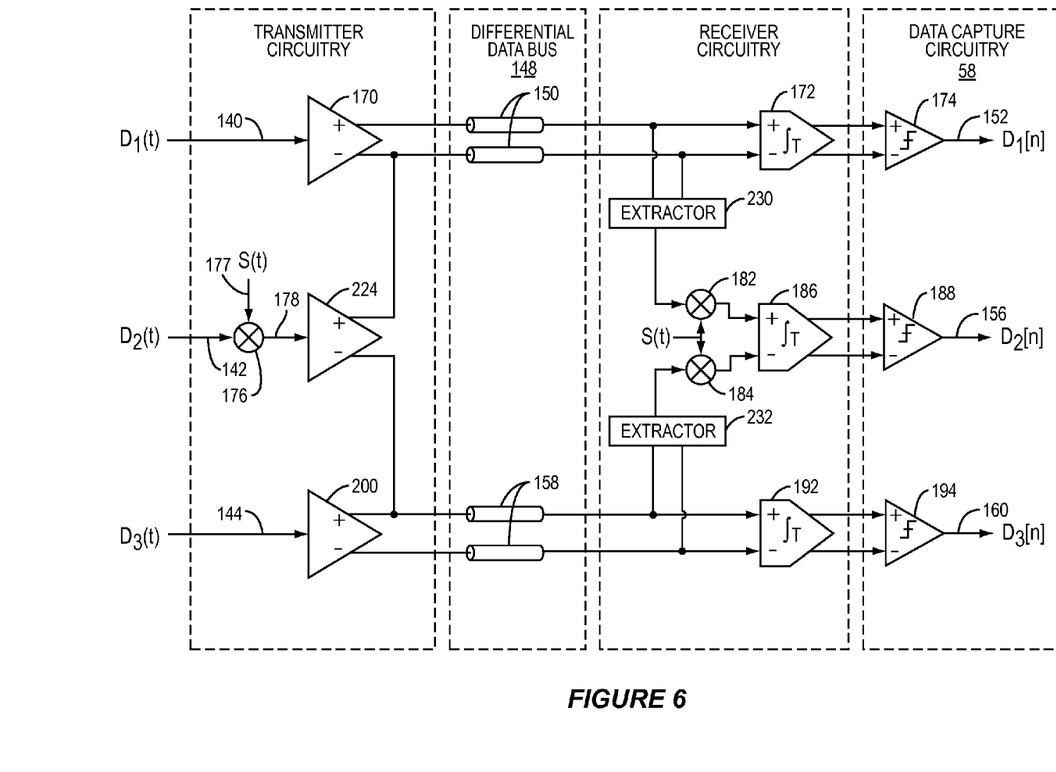
FIG. 6 depicts an example of a spread spectrum based differential interconnect to communicate a phantom signal.

FIG. 6 is similar to FIG. 5 except the differential signals generated by the first differential driver 224 are transmitted through the first differential data line 150 and the third differential data line 158 as differential mode signals. The extractors 230 and 232 extract the differential mode signals. The spreading code, S(t), is selected to be [1, −1] to permit the first integrator 172 and third integrator 192 to remove the differential signals associated with the second data signal ($D_2(t)$) 142. Applying the CDMA techniques to multi-wire signaling techniques realize (n−1) differential links out of n wire when spreading is applied to every adjacent differential link.

Figure 7:
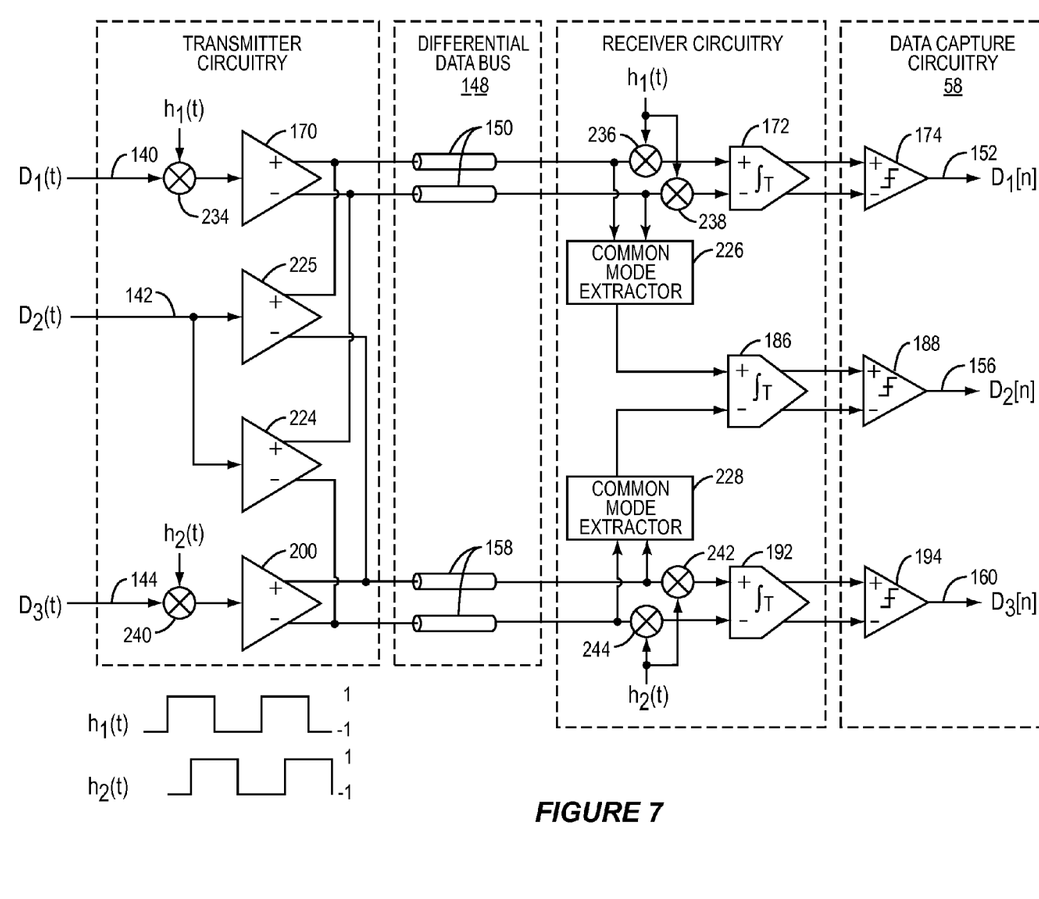
FIG. 7 depicts an example of a spread spectrum based differential interconnect to communicate a phantom signal.

FIG. 7 is similar to FIG. 5 except the first data signal 140 and the third data signal 144 are multiplied by a spreading code $h_1(t)=[1, 1, -1, -1]$ and $h_2(t)=[-1, 1, 1, -1]$, respectively, while the second data signal 142 is multiplied by a spreading signal equal to [1, 1, 1, 1].

Illustratively, the first multiplier 234 multiplies the first data signal 140 by the spreading code $h_1(t)$. The second multiplier 236 and third multiplier 238 multiply the differential components of the received signal by the spreading code $h_1(t)$ to remove the spreading code. This permits the first integrator 172 and first decision device 174 to recover the first data signal 140 and remove the common mode signals sent through the first differential data line 150.

The fourth multiplier 240 multiplies the second data signal 144 by the spreading code $h_2(t)$. The fifth multiplier 242 and sixth multiplier 244 multiply the differential components of the received signal by the spreading code $h_2(t)$ to remove the spreading code. This permits the third integrator 192 and third decision device 194 to recover the third data signal 144 and remove the common mode signals sent through the third differential data line 158.

Those skilled in the art will recognize improvements and modifications to the embodiments of the present disclosure. All such improvements and modifications are considered within the scope of the concepts disclosed herein and the claims that follow.

What is claimed is:

1. A data bus on an integrated circuit die comprising:
   a first data line, the first data line having a first end and a second end;
   a second data line adjacent to the first data line, the second data line having a first end and a second end;
   a first line driver including a first line driver input configured to receive a first data signal and a first line driver output in communication with the first end of the first data line, wherein the first line driver is configured to drive the first data signal onto the first data line;
   a first integrator including an input in communication with the second end of the first data line, wherein the first integrator is configured to receive the first data signal and integrate the first data signal to generate a first received output;
   a second line driver including a second line driver input and a second line driver output, wherein the second line driver output is in communication with the first end of the second data line;
   a first multiplier including a first input configured to receive a second data signal, a second input configured to receive a spread spectrum code, and an output in communication with the second line driver input, wherein the first multiplier is configured to modulate the second data signal based on the spread spectrum code to generate a modulated signal;

a second multiplier including an output, a first input coupled to the second end of the second data line, and a second input configured to receive a spreading code, wherein the second multiplier is configured to de-modulate the modulated signal based on the spreading code to generate a de-modulated signal; and a second integrator in communication with the output of the second multiplier, the second integrator configured to integrate the de-modulated signal to generate a second received output;

wherein the modulated signal received by the second multiplier is swing compensated.

2. The data bus of claim 1, further comprising:

a first decision device configured to receive the first received output, wherein the first decision device is configured to capture the first received output; and a second decision device configured to receive the second received output, wherein the second decision device is configured to capture the first received output.

3. The data bus of claim 1, further comprising:

clock forwarding circuitry coupled to an input clock signal, wherein the clock forwarding circuitry is configured to time align the spread spectrum code at the second multiplier based upon propagation delay through the second data line.

4. The data bus of claim 1, further including a first data buffer and a second data buffer, wherein an output of the first data buffer is coupled to the first line driver input; and wherein an output of the second data buffer is coupled to the first input of the first multiplier, and the output of the second data buffer is configured to provide the first data signal to the first multiplier.

5. A method for transmitting data over a data bus to reduce crosstalk comprising:

providing the data bus on a chip die having a plurality of data lines, wherein each of the plurality of data lines is parallel to each of the plurality of data lines;

multiplying each of a plurality of data signals by a respective one of a plurality of spreading codes to generate a plurality of synchronous CDMA data signals;

transmitting each of the plurality of synchronous CDMA data signals through a respective one of the plurality of data lines;

receiving the plurality of synchronous CDMA data signals;

multiplying each of the plurality of synchronous CDMA data signals by the respective one of the plurality of spreading codes to generate received data signals;

suppressing crosstalk between data lines without a priori knowledge of potential crosstalk; and wherein multiplying each of the plurality of data signals by the respective one of the plurality of spreading codes to generate the plurality of synchronous CDMA data signals further includes gain compensating each of the plurality of synchronous CDMA data signals.

6. The method of claim 5, wherein each of the plurality of data lines is a differential data line.

7. A data bus on a semiconductor die comprising:

one or more data links on the semiconductor die, wherein each of the one or more data links is configured to receive a data bit, and wherein each of the one or more data links has a unique spreading code, and wherein each respective data line of the one or more data links includes:

a first multiplier including a first input configured to receive a data bit signal and a second input configured to receive the unique spreading code, the first multiplier configured to generate a modulated data bit based upon the data bit signal and the unique spreading code of the respective data line;

a line driver including a line driver input configured to receive the modulated data bit and a line driver output coupled to a first end of a data line;

a second multiplier including a first input coupled to a second end of the data line and a second input configured to receive the unique spreading code, the second multiplier configured to generate a de-modulated data bit based upon the modulated data bit and the unique spreading code of the respective data line; and an integrator in communication with the second multiplier and configured to generate an integrated output based upon the de-modulated data bit;

wherein each of the one or more data links further includes a sample and hold circuit configured to generate a received data bit based upon the integrated output.

8. The data bus of claim 7, where each of the one or more data links further includes a data buffer, wherein the data buffer is configured to receive one of one or more input data bits and output the data bit signal.

9. The data bus of claim 7, wherein the modulated data bit is swing compensated prior to transmission on the data line.

10. The data bus of claim 7, wherein the unique spreading code received by the second multiplier is a propagation compensated spreading code, the data bus further including a clock forwarding circuit, wherein the clock forwarding circuit is configured to generate the propagation compensated spreading code.

11. A data bus comprising:

a first differential data bus configured to differentially transmit a first CDMA spread spectrum signal over the first differential data bus;

a second differential data bus configured to differentially transmit a second CDMA spread spectrum signal over the first differential data bus;

a differential phantom data link configured to transmit a third CDMA spread spectrum signal over the first differential data bus and the second differential data bus wherein the differential phantom data link comprises:

a first differential driver in communication with the second CDMA spread spectrum signal, wherein the first differential driver generates a first non-inverted output and a first inverted output; and a second differential driver in communication with the second CDMA spread spectrum signal, wherein the second differential driver generates a second non-inverted output and a second inverted output;

the first differential data bus configured to receive the first non-inverted output and the second non-inverted output; and the second differential data bus configured to receive the first inverted output and the second inverted output.

12. The data bus of claim 11, further comprising a first common mode extractor circuit coupled to the first differential data bus and a second common mode extractor coupled to the second differential data bus;

wherein the first common mode extractor circuit is configured to provide a non-inverted output corresponding to the third CDMA spread spectrum signal; and wherein the first common mode extractor circuit is configured to provide an inverted output corresponding to the third CDMA spread spectrum signal.

13. The data bus of claim 12, further comprising:

an integrator configured to receive the non-inverted output corresponding to the third CDMA spread spectrum signal and the inverted output corresponding to the third CDMA spread spectrum signal, wherein the integrator is further configured to provide an output to a decision device.

14. An integrated circuit comprising:

a semiconductor die including a data bus disposed thereupon, the data bus including:
  a data line including a first end and a second end;
  a line driver including a line driver input and a line driver output, wherein the line driver output is coupled to the first end of the data line;
  a first multiplier including a first input configured to receive a data signal, a second input configured to receive a spread spectrum code, and an output in communication with the line driver input, wherein the first multiplier is configured to modulate the data signal based on the spread spectrum code to generate a modulated signal;
  a second multiplier including an output, a first input coupled to the second end of the data line, and a second input configured to receive the spread spectrum code, wherein the second multiplier is configured to de-modulate the modulated signal based on the spread spectrum code to generate a de-modulated signal; and
  an integrator in communication with the output of the second multiplier, the integrator configured to integrate the de-modulated signal to generate a received signal; and
  a decision device configured to receive the received signal, wherein the decision device is further configured to sample the received signal to recover the data signal;
  wherein the modulated signal received by the second multiplier is swing compensated.

15. A data bus on an integrated circuit die comprising:

a first data line, the first data line having a first end and a second end;

a second data line adjacent to the first data line, the second data line having a first end and a second end;

a first line driver including a first line driver input configured to receive a first data signal and a first line driver output in communication with the first end of the first data line, wherein the first line driver is configured to drive the first data signal onto the first data line;

a first integrator including an input in communication with the second end of the first data line, wherein the first integrator is configured to receive the first data signal and integrate the first data signal to generate a first received output;

a second line driver including a second line driver input and a second line driver output, wherein the second line driver output is in communication with the first end of the second data line;

a first multiplier including a first input configured to receive a second data signal, a second input configured to receive a spread spectrum code, and an output in communication with the second line driver input, wherein the first multiplier is configured to modulate the second data signal based on the spread spectrum code to generate a modulated signal;

a second multiplier including an output, a first input coupled to the second end of the second data line, and a second input configured to receive a spreading code, wherein the second multiplier is configured to de-modulate the modulated signal based on the spreading code to generate a de-modulated signal;

a second integrator in communication with the output of the second multiplier, the second integrator configured to integrate the de-modulated signal to generate a second received output;

a first decision device configured to receive the first received output, wherein the first decision device is configured to capture the first received output;

a second decision device configured to receive the second received output, wherein the second decision device is configured to capture the first received output; and clock forwarding circuitry coupled to an input clock signal, wherein the clock forwarding circuitry is configured to time align the spread spectrum code at the second multiplier based upon propagation delay through the second data line.

16. The data bus of claim 15, wherein the modulated signal received by the second multiplier is swing compensated.

17. A data bus on a semiconductor die comprising:

one or more data links on the semiconductor die, wherein each of the one or more data links is configured to receive a data bit, and wherein each of the one or more data links has a unique spreading code, and wherein each respective data line of the one or more data links includes:
  a first multiplier including a first input configured to receive a data bit signal and a second input configured to receive the unique spreading code, the first multiplier configured to generate a modulated data bit based upon the data bit signal and the unique spreading code of the respective data line;
  a line driver including a line driver input configured to receive the modulated data bit and a line driver output coupled to a first end of a data line;
  a second multiplier including a first input coupled to a second end of the data line and a second input configured to receive the unique spreading code, the second multiplier configured to generate a de-modulated data bit based upon the modulated data bit and the unique spreading code of the respective data line; and
  an integrator in communication with the second multiplier and configured to generate an integrated output based upon the de-modulated data bit;
  wherein the modulated data bit is swing compensated prior to transmission on the data line.

18. A data bus on a semiconductor die comprising:

one or more data links on the semiconductor die, wherein each of the one or more data links is configured to receive a data bit, and wherein each of the one or more data links has a unique spreading code, and wherein each respective data line of the one or more data links includes:
  a first multiplier including a first input configured to receive a data bit signal and a second input configured to receive the unique spreading code, the first multiplier configured to generate a modulated data bit based upon the data bit signal and the unique spreading code of the respective data line;

a line driver including a line driver input configured to receive the modulated data bit and a line driver output coupled to a first end of a data line;

a second multiplier including a first input coupled to a second end of the data line, a second input configured to receive the unique spreading code, the second multiplier configured to generate a de-modulated data bit based upon the modulated data bit and the unique spreading code of the respective data line; and an integrator in communication with the second multiplier and configured to generate an integrated output based upon the de-modulated data bit;

wherein the unique spreading code received by the second multiplier is a propagation compensated spreading code, the data bus further including a clock forwarding circuit, wherein the clock forwarding circuit is configured to generate the propagation compensated spreading code.

* * * * *